(12) United States Patent
Kawasaki (10) Patent No.: US 7,455,366 B2
(45) Date of Patent: Nov. 25, 2008

(54) THIN SHEET

(75) Inventor: Seiji Kawasaki, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 448 days.

(21) Appl. No.: 10/496,133

(22) PCT Filed: Aug. 7, 2003

(86) PCT No.: PCT/JP03/10043

§ 371 (c)(1),
(2), (4) Date: May 20, 2004

(87) PCT Pub. No.: WO2004/014192

PCT Pub. Date: Feb. 19, 2004

(65) Prior Publication Data

US 2004/0262976 A1  Dec. 30, 2004

(30) Foreign Application Priority Data

Aug. 7, 2002   (JP) .............................. 2002-229640

(51) Int. Cl.
   *A47C 7/02*   (2006.01)
(52) U.S. Cl. .............................. 297/452.64; 297/440.11
(58) Field of Classification Search ............ 297/440.11, 297/452.64, 219.1
   See application file for complete search history.

(56) References Cited

U.S. PATENT DOCUMENTS

| | | | | |
|---|---|---|---|---|
| 3,981,538 | A | * | 9/1976 | Chubb .................. 297/452.13 |
| 4,077,669 | A | | 3/1978 | Fox |
| 4,693,510 | A | * | 9/1987 | Marchesini ............ 297/440.11 |
| 5,787,562 | A | | 8/1998 | Penley |
| 6,332,651 | B1 | | 12/2001 | Horisawa |
| 2002/0043867 | A1 | * | 4/2002 | Lessmann ........... 297/452.64 X |

FOREIGN PATENT DOCUMENTS

| | | |
|---|---|---|
| CN | 2038742 | 6/1989 |
| EP | 1 177 935 | 2/2002 |
| FR | 1.563.258 | 4/1969 |
| GB | 2 206 787 | 1/1989 |
| JP | 63-161553 | 10/1988 |
| JP | 1-95142 | 6/1989 |
| JP | 2000-79840 | 3/2000 |
| JP | 2001-128783 | 5/2001 |

* cited by examiner

*Primary Examiner*—Anthony D. Barfield
(74) *Attorney, Agent, or Firm*—Wenderoth, Lind & Ponack, L.L.P.

(57) ABSTRACT

A cushioning material 8 is stretched over a frame 6 by engaging only front and rear edges of the cushioning material 8 with the frame 6, thereby applying a tension to the cushioning material 8 substantially only in the longitudinal direction thereof.

12 Claims, 7 Drawing Sheets

TENSION   SLACK
SLACK   TENSION
RIGIDITY IS INCREASED

THIN SHEET

TECHNICAL FIELD

The present invention relates to a lightweight and thin seat that can be employed in a folding wheelchair.

BACKGROUND ART

Conventional automobile seats generally include spring members attached to a seat frame, a pad material such as a foamed material or cotton placed thereon, and a skin such as a vinyl leather, woven cloth, or leather covered thereon.

On the other hand, seats other than the automobile seats generally include a pad material placed on the frame and covered with a skin, and some of them also include spring members for enhancing the cushioning characteristics.

However, such seats are mostly thick, heavy and costly.

In view of the above, a variety of lightweight, inexpensive and thin seats have been recently proposed, and the inventors of this application have developed thin seats having a lightweight net of a three-dimensional structure that is provided with desired characteristics (spring characteristics, damping characteristics and the like) sufficient for a cushioning material.

A three-dimensional net (hereinafter referred to as 3-D net) employed in such thin seats is formed of a three-dimensional knit fabric, which has a ground fabric formed into, for example, a knit texture or a honeycomb-shaped (hexagonal) mesh. The 3-D net has a three-layered solid truss structure in which an upper mesh layer and a lower mesh layer are connected to each other by a pile layer having a large number of piles. Each yarn of the upper mesh layer and the lower mesh layer is formed by twisting a number of fine threads, while each of the piles is formed of a single thick string to provide the three-dimensional knit fabric with rigidity.

Figure 7:
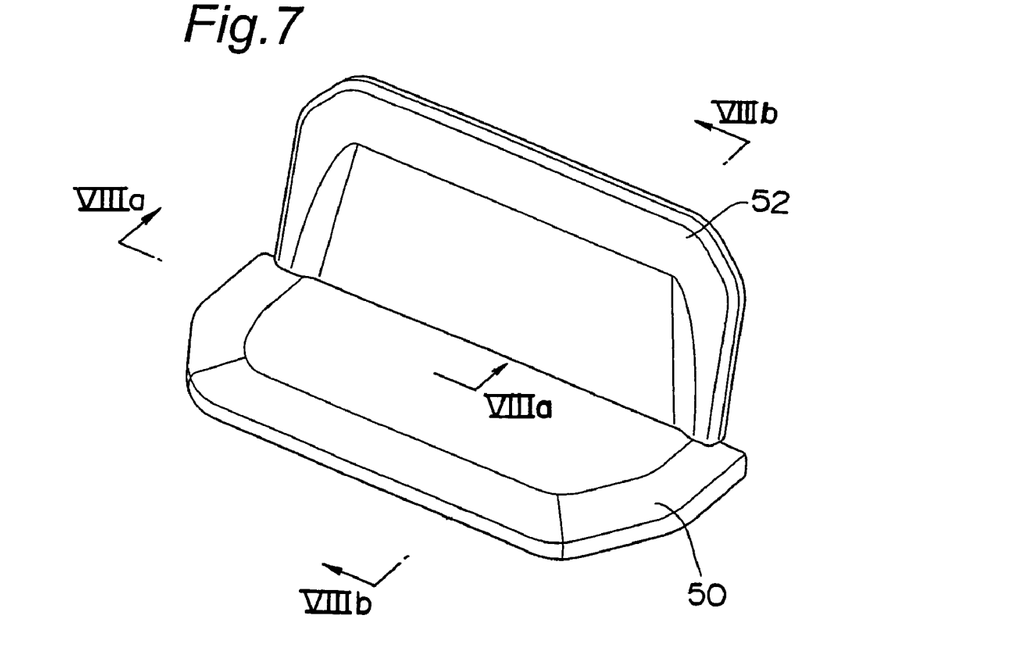
FIG. 7 is a perspective view of the thin seat according to the present invention and that of a conventional thin seat.

FIG. 7 depicts an example of the above-described conventional thin seats, which is built for two persons and includes a seat cushion 50 having a 3-D net and a seat back 52 extending upwards from a rear edge of the seat cushion 50.

Figure 8A:
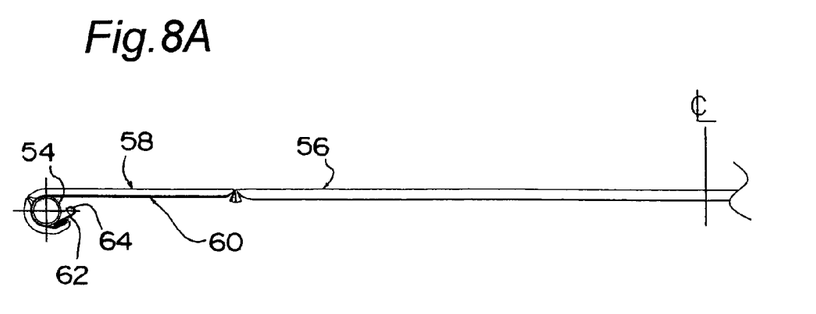
FIG. 8A is a sectional view of the conventional thin seat taken along line VIIIa-VIIIa in FIG. 7.
Figure 8B:
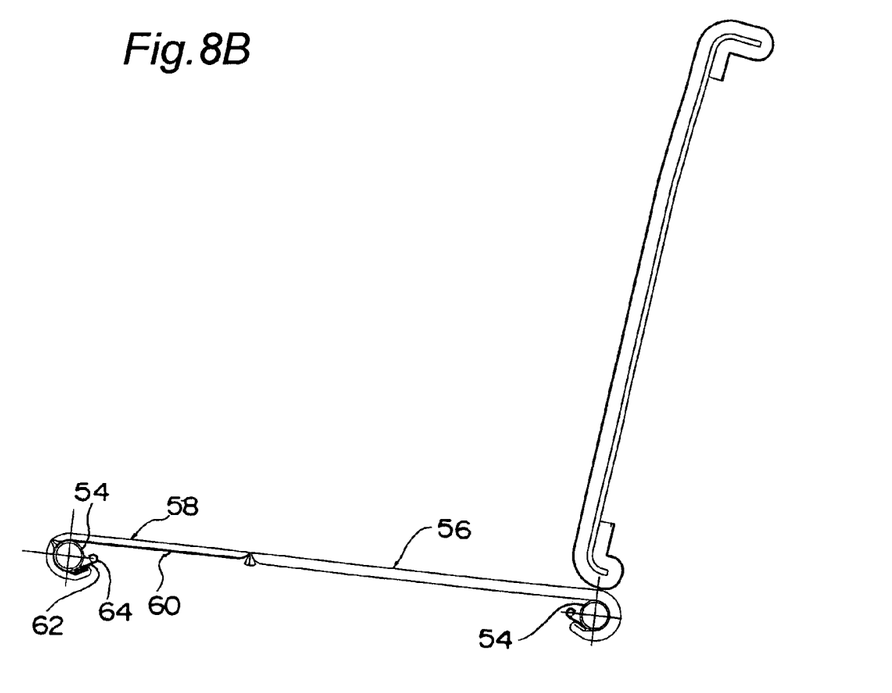
FIG. 8B is a sectional view of the conventional thin seat taken along line VIIIb-VIIIb in FIG. 7.

As shown in FIG. 7 and FIGS. 8A and 8B, the seat cushion 50 includes a seat cushion frame 54 and a 3-D net 56 stretched over the seat cushion frame 54. An outer edge portion of the 3-D net 56 is sewn to an inner edge portion of a trim material (skin) 58 and that of a tension member 60, while an outer edge portion of the trim material 58 and that of the tension member 60 are wound around the seat cushion frame 54 and then engaged with a trim retainer 64 by a retainer piece 62, thereby applying a predetermined tension to the seat cushion 50.

However, when a person sits on the conventional thin seat of the above-described construction, a tension is applied to the trim material 58 and increases the tension of the seat cushion 50, resulting in an increase in side pressure. Accordingly, when a person sits on a portion offset from the center of the seat cushion 50 or two persons sit on the seat cushion 50, his or their postures tend to incline to some extent, deteriorating the sitting feeling.

The present invention has been developed to overcome the above-described disadvantages inherent in the prior art and is intended to provide a thin seat having improved cushioning characteristics that enables a seat occupant to have a good posture and can withstand a long-term use.

DISCLOSURE OF THE INVENTION

In accomplishing the above objective, the thin seat according to the present invention is characterized by comprising a frame and a cushioning material stretched over the frame, wherein a tension is applied to the cushioning material substantially only in a longitudinal direction (front-to-back direction) thereof by engaging only front and rear edges of the cushioning material with the frame.

The thin seat is also characterized by further comprising a reinforcement patch provided on a central portion of the cushioning material in a widthwise direction thereof.

Furthermore, the thin seat is characterized in that a material of the reinforcement patch is identical with that of the cushioning material.

The thin seat is also characterized in that the cushioning material comprises an elastic cloth having warps and wefts different in tensile characteristics, and the wefts have a larger spring constant than the warps.

The thin seat is also characterized by further comprising a trim material covered on the elastic cloth and a 3-D net or urethane interposed between the elastic cloth and the trim material.

The thin seat is further characterized in that end portions of the elastic cloth in a widthwise direction of the seat are loosened.

DETAILED DESCRIPTION OF THE PREFERRED EMBODIMENTS

FIG. 1, FIG. 2 and FIGS. 3A to 3C depict a thin seat S according to the present invention having an appearance substantially similar to that of the conventional thin seat of FIG. 7.

As shown in FIG. 1, FIG. 2 and FIGS. 3A to 3C, the thin seat S according to the present invention includes a seat cushion 2 and a seat back 4 extending upwards from a rear edge of the seat cushion 2. The seat cushion 2 includes a seat cushion frame 6, an elastic cloth 8 employed as a cushioning material and stretched over the seat cushion frame 6, and a 3-D net 10 covered with a trim material (skin) 12.

Figure 1:
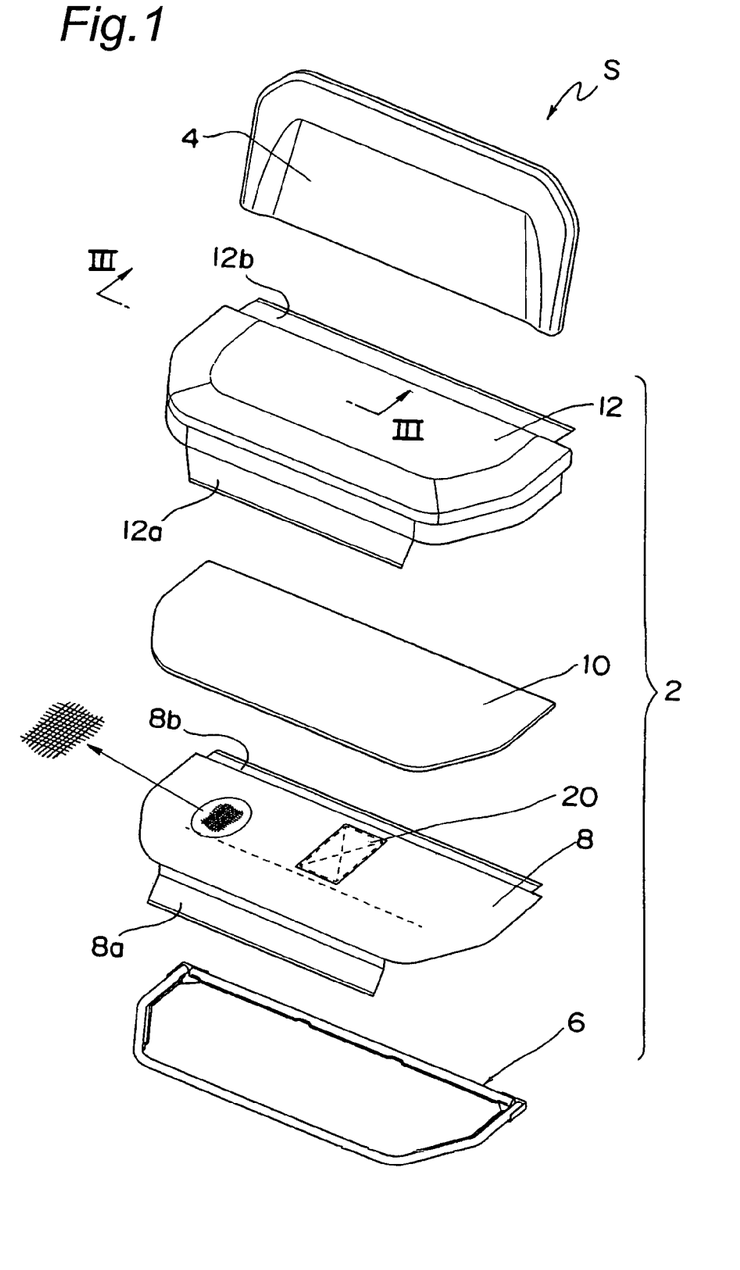
FIG. 1 is an exploded perspective view of a thin seat according to the present invention.
Figure 2:
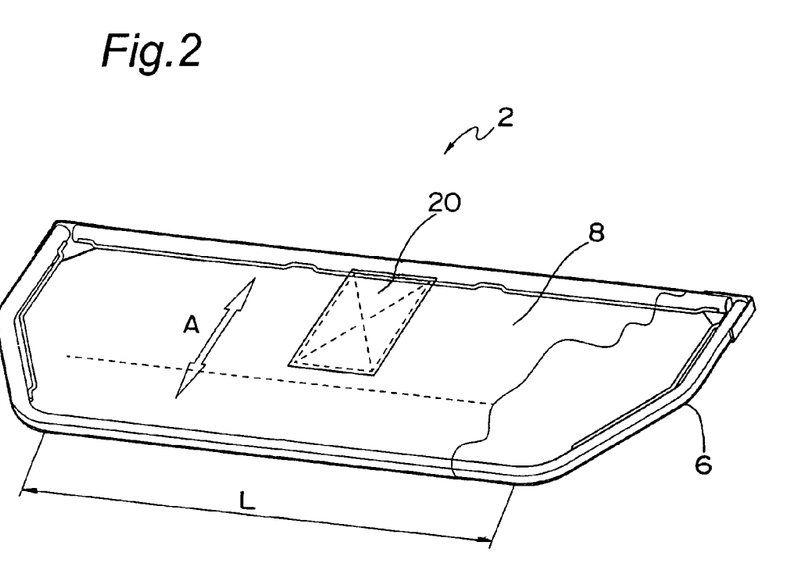
FIG. 2 is a perspective view, partly in section, of a seat cushion provided in the thin seat of FIG. 1.

The elastic cloth 8 has a first engaging portion 8a formed at a front edge thereof and a second engaging portion 8b formed at a rear edge thereof.

Figure 3A:
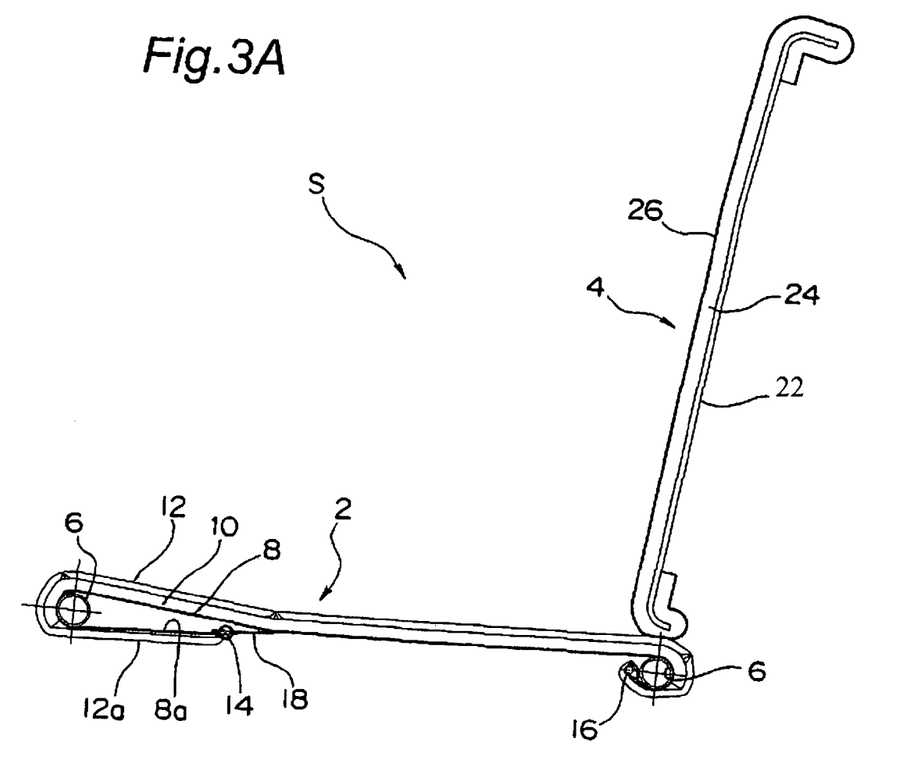
FIG. 3A is a vertical sectional view of the thin seat of FIG. 1.

As shown in FIG. 3A, the first engaging portion 8a engages at a distal end portion thereof with a trim retainer 14 joined to the seat cushion frame 6, the second engaging portion 8b similarly engages at a distal end portion thereof with a trim retainer 16 joined to the seat cushion frame 6, and the elastic cloth 8 engages at an intermediate portion thereof with the trim retainer 14 via a retainer piece 18, thereby applying a predetermined tension to the elastic cloth 8 in the longitudinal direction of the seat.

Figure 3B:
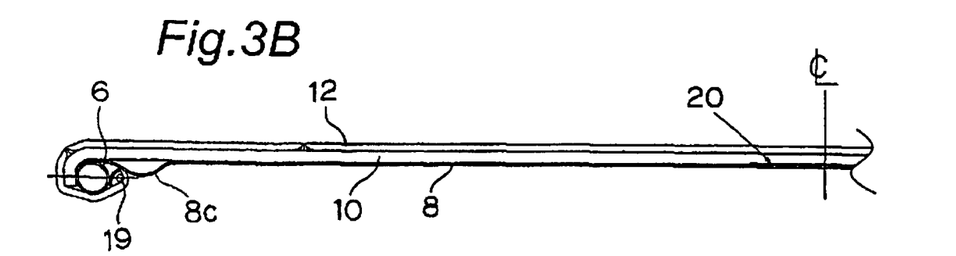
FIG. 3B is a sectional view taken along line III-III in FIG. 1.
Figure 3C:
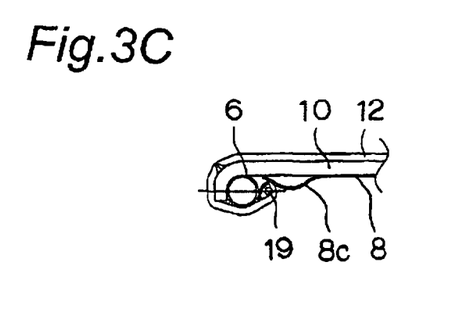
FIG. 3C is a partial sectional view of the thin seat of FIG. 1.

On the other hand, in the widthwise direction of the seat, only the trim material 12 engages at respective side portions thereof with a trim retainer 19 joined to the seat cushion frame 6, while the elastic cloth 8 does not engage with the trim retainer 19 as shown in FIG. 3C or engages at respective side portions 8c thereof with the trim retainer 19 with the side portions 8c loosened as shown in FIG. 3B. Accordingly, even in the sitting condition, the tension in the widthwise direction of the seat is so set as to be quasi zero (elongation: about 0~5%) and, hence, practically no tension is created in this direction.

Respective side portions of the 3-D net 10 interposed between the elastic cloth 8 and the trim material 12 are clamped between the seat cushion frame 6 and the trim material 12.

A cloth made up of warps (yarns extending in the longitudinal direction of the seat S) and wefts (yarns extending in the widthwise direction of the seat S) having different tensile characteristics may be used for the elastic cloth 8. The use of warps, in which a tension is created, having a larger elongation to load than wefts enhances the cushioning characteristics.

Figure 4:
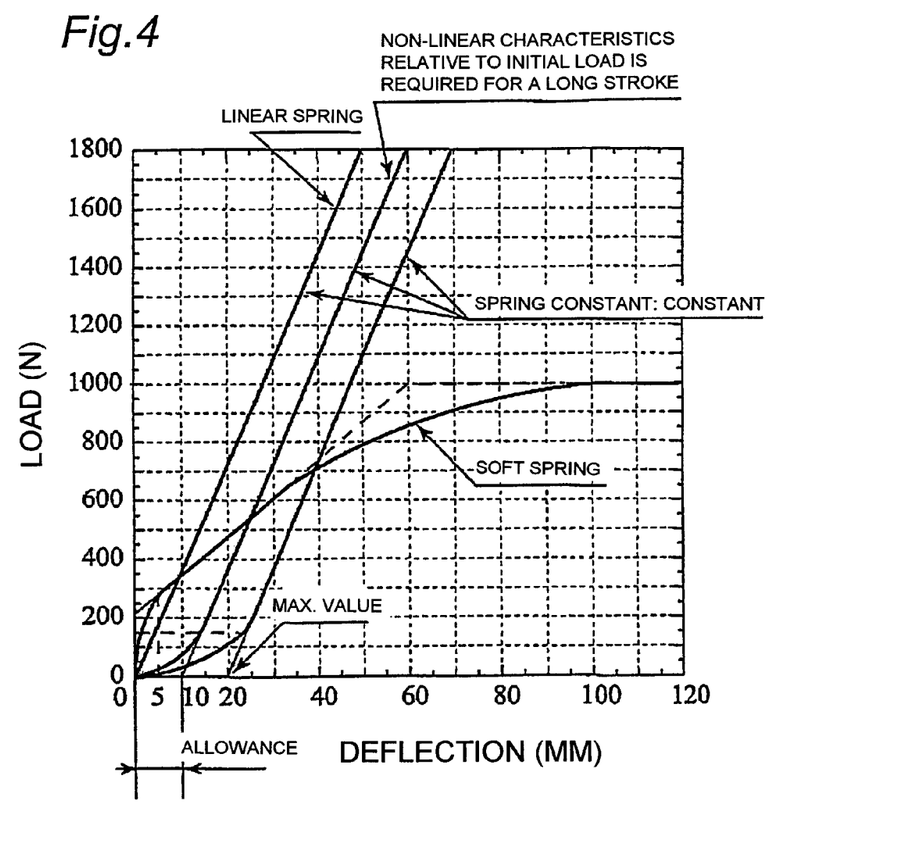
FIG. 4 is a graph indicating the static characteristics where a cloth woven with the use of elastic yarns as warps and polyester-based fibers as wefts has been used for an elastic cloth in the thin seat of FIG. 1.

FIG. 4 is a graph indicating the static characteristics (tensile characteristics) where a cloth woven with the use of elastic yarns (softened spring) as warps and polyester-based fibers (linear spring) as wefts has been used for the elastic cloth 8. Such static characteristics have been obtained by using test pieces cut off from an elastic cloth material into a size of 200 mmL×50 mmW and by pulling them at a speed of 50 mm/min in the longitudinal direction thereof while gripping opposite end portions thereof to a length 50 mm inwards. The tensile characteristics of the elastic yarns have been obtained using the test pieces that have elastic yarns extending in the longitudinal direction thereof, while the tensile characteristics of the polyester-based fibers have been obtained using the test pieces that have polyester-based fibers extending in the longitudinal direction thereof.

As can be seen from the graph of FIG. 4, the elastic cloth 8 has a tendency to easily elongate in the longitudinal direction thereof because the warps have a larger elongation to load than the wefts. If a long stroke is desired, the use of wefts having non-linear characteristics relative to the initial load is required. However, if linear springs have substantially the same spring constant, they may have an allowable deflection in the range of 0~10 mm or a maximum deflection of 20 mm at a load of zero.

Furthermore, the elastic cloth 8 has a rectangular reinforcement patch 20 sewn thereto at a rear region of a central portion in the widthwise direction thereof. A material similar to the elastic cloth 8 can be used for the reinforcement patch 20.

In FIG. 2, an arrow A indicates the direction in which the tension is applied in the sitting condition, and this direction coincides with the direction in which the warps extend. A range L in the widthwise direction indicates the range in which the longitudinal tension is applied, and coincides with the length of the first engaging portion 8a.

As is the case with the elastic cloth 8, the trim material 12 has a first engaging portion 12a formed at a front edge thereof and a second engaging portion 12b formed at a rear edge thereof. The first engaging portion 12a together with the first engaging portion 8a of the elastic cloth 8 engages at a distal end portion thereof with the trim retainer 14, while the second engaging portion 12b together with the second engaging portion 8b of the elastic cloth 8 similarly engages at a distal end portion thereof with the trim retainer 16, thereby applying a predetermined tension to the trim material 12.

When a person sits on the thin seat S of the above-described construction according to the present invention, a tension is applied in the longitudinal direction (direction of the arrow A) and practically no tension is applied in the widthwise direction. Accordingly, the side pressure does not increase, unlike the conventional thin seat. Further, because a reinforcement patch 20 is provided in the central portion of the elastic cloth 8, even when two persons sit on the seat S, the influence of the body weight can be reduced, making it possible to prevent their postures from inclining.

Figure 5:
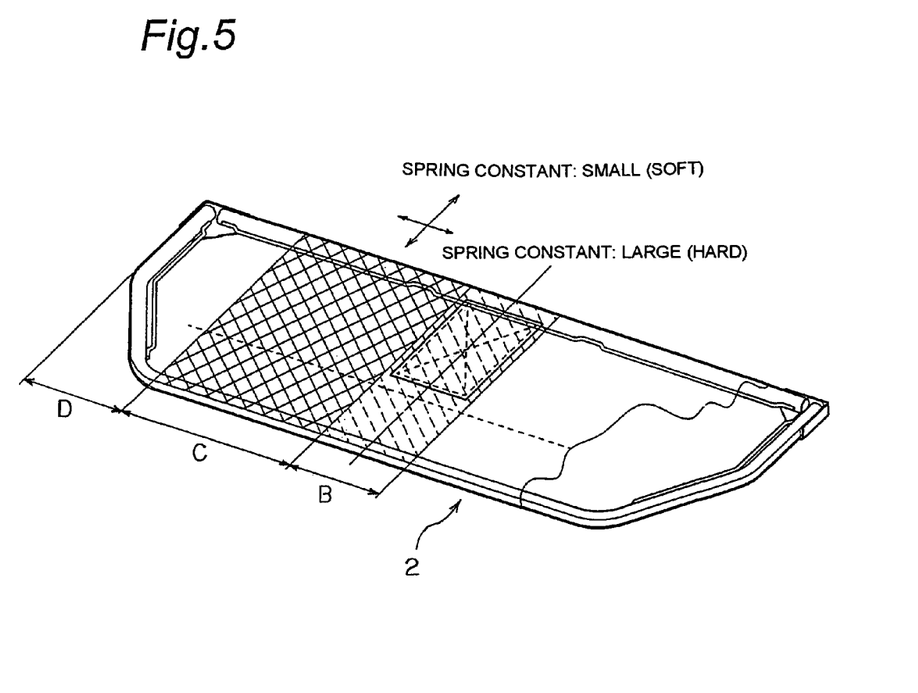
FIG. 5 is a perspective view depicting portions of the seat cushion that differ in tension in a sitting condition.

FIG. 5 depicts several portions on the seat cushion 2 that have different tensions in the sitting condition. A central region B in the widthwise direction has a larger tension and a higher rigidity than a sitting region C. Accordingly, the region B is short in stroke, and a member such as a frame or the like can be arranged there, if necessary. A side region D in the widthwise direction indicates the region where the side portion 8c of the elastic cloth 8 is loosened.

Figure 6:
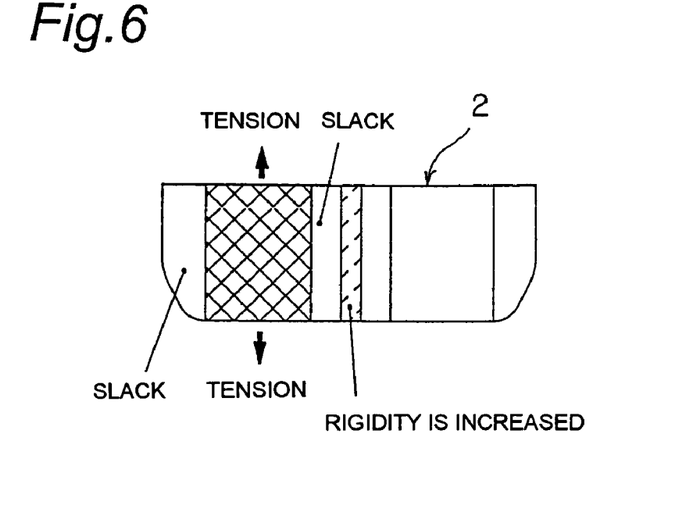
FIG. 6 is a schematic top plan view of the seat cushion where an increase in stroke in the sitting condition is desired.

If an increase in stroke in the sitting condition is desired, a longitudinal tension is applied to the sitting region by increasing the rigidity of the central region of the seat cushion 2 in the widthwise direction and by loosening a portion between the central region and the sitting region. That is, it is sufficient if end portions of the elastic cloth 8 positioned between the central region and the sitting region are caused to engage with respective trim retainers under a loosened condition or not to engage therewith.

Although in the above-described embodiment a 3-D net 10 is interposed between an elastic cloth 8 and a trim material 12, an elastic material such as urethane may be used in place of the 3-D net 10.

Furthermore, in FIG. 1 and FIG. 3A, the seat back 4 is made up of a plate material 22, a cushioning material 24 covered on the plate material 22, and a trim material (skin) 26 covered on the cushioning material 24, a 3-D net may be used for the cushioning material 24.

The thin seat S of the above-described construction can be used for a folding wheelchair. In this case, it is preferred that a predetermined tension be applied not only in the longitudinal direction of the seat but also in the widthwise direction of the seat.

The seat according to the present invention constructed in the manner as described above offers the following effects.

Because a tension is applied to a cushioning material substantially only in a longitudinal direction thereof by engaging only front and rear edges of the cushioning material with a frame, no side pressure is applied to a seat occupant, unlike conventional thin seats. Accordingly, it is possible to provide a thin seat having improved cushioning characteristics that enables the seat occupant to have a good posture and can withstand a long-term use.

Because a reinforcement patch is provided on a central portion of the cushioning material in a widthwise direction thereof, even when two persons sit on the seat, the influence of the body weight can be reduced, making it possible to prevent their postures from inclining and enhance the sitting feeling.

Furthermore, because an elastic cloth (made up of warps, and wefts having a larger spring constant than the warps) is used for the cushioning material, the elongation in the widthwise direction thereof is slight, making it possible to prevent the body from inclining.

Also, because the elastic cloth is covered with a trim material and a 3-D net or urethane is interposed between the elastic cloth and the trim material, a thin and lightweight seat having improved cushioning characteristics can be provided.

In addition, because end portions of the elastic cloth in the widthwise direction of the seat are loosened, the elongation in the widthwise direction thereof is slight, making it possible to prevent the body from inclining.

The invention claimed is:

1. A thin seat comprising:
   a frame;
   a cushioning material stretched over the frame so as to have front and rear edges opposite each other in a longitudinal direction and first and second side edges opposite each other in a widthwise direction transverse to the longitudinal direction, the cushioning material having two sitting regions spaced away from each other in the widthwise direction, said two sitting regions being configured and arranged to allow two people to sit down thereon, respectively; and
   a reinforcement member sewn to the cushioning material solely between the two sitting regions;
   wherein a tension is applied to the cushioning material substantially only in the longitudinal direction thereof by engaging only the front and rear edges of the cushioning material with the frame;
   wherein said frame has a front frame part and a rear frame part, which are separated from each other along the longitudinal direction; and
   wherein said front edge of said cushioning material is attached directly on said front frame part, and said rear edge of said cushioning material is attached directly on said rear frame part.

2. The thin seat according to claim 1, wherein a material of the reinforcement member is identical with that of the cushioning material.

3. The thin seat according to claim 2, wherein the cushioning material comprises an elastic cloth having warps and wefts different in tensile characteristics, and the wefts have a larger spring constant than the warps.

4. The thin seat according to claim 1, wherein the cushioning material comprises an elastic cloth having warps and wefts different in tensile characteristics, and the wefts have a larger spring constant than the warps.

5. The thin seat according to claim 4, further comprising a trim material covered on the elastic cloth and a 3-D net or urethane interposed between the elastic cloth and the trim material.

6. The thin seat according to claim 5, wherein end portions of the elastic cloth in the widthwise direction of the seat are loosened.

7. The thin seat according to claim 4, wherein end portions of the elastic cloth in the widthwise direction of the seat are loosened.

8. The thin seat according to claim 4, further comprising a trim material covered on the elastic cloth and a 3-D net interposed between the elastic cloth and the trim material.

9. The thin seat according to claim 1, wherein
   said thin seat includes a seat cushion having a front end and a rear end, and a seat back having a bottom end mounted to said rear end of said seat cushion and a top end spaced above said bottom end;
   said seat cushion is constituted by said frame, said cushioning material, and said reinforcement member; and
   said front and rear edges of said cushioning material are engaged with said frame at said front and rear ends, respectively, of said seat cushion.

10. The thin seat according to claim 1, wherein
    said front frame part extends in the widthwise direction, and said rear frame part extends in said widthwise direction and is disposed rearwardly of said front frame part in said longitudinal direction; and
    said cushioning material is stretched directly between said front frame part and said rear frame part so as to extend in a direction from said front frame part to said rear frame part.

11. The thin seat according to claim 1, wherein
    said two sitting regions of said cushioning material face in a same direction.

12. The thin seat according to claim 1, wherein
    said cushioning material and said reinforcement member are superposed one over the other.

* * * * *